Sept. 8, 1936.   E. J. KINGSBURY   2,053,398
MACHINE TOOL UNIT WITH DOUBLE FEEDING SYSTEM
Filed Aug. 11, 1932   5 Sheets-Sheet 1
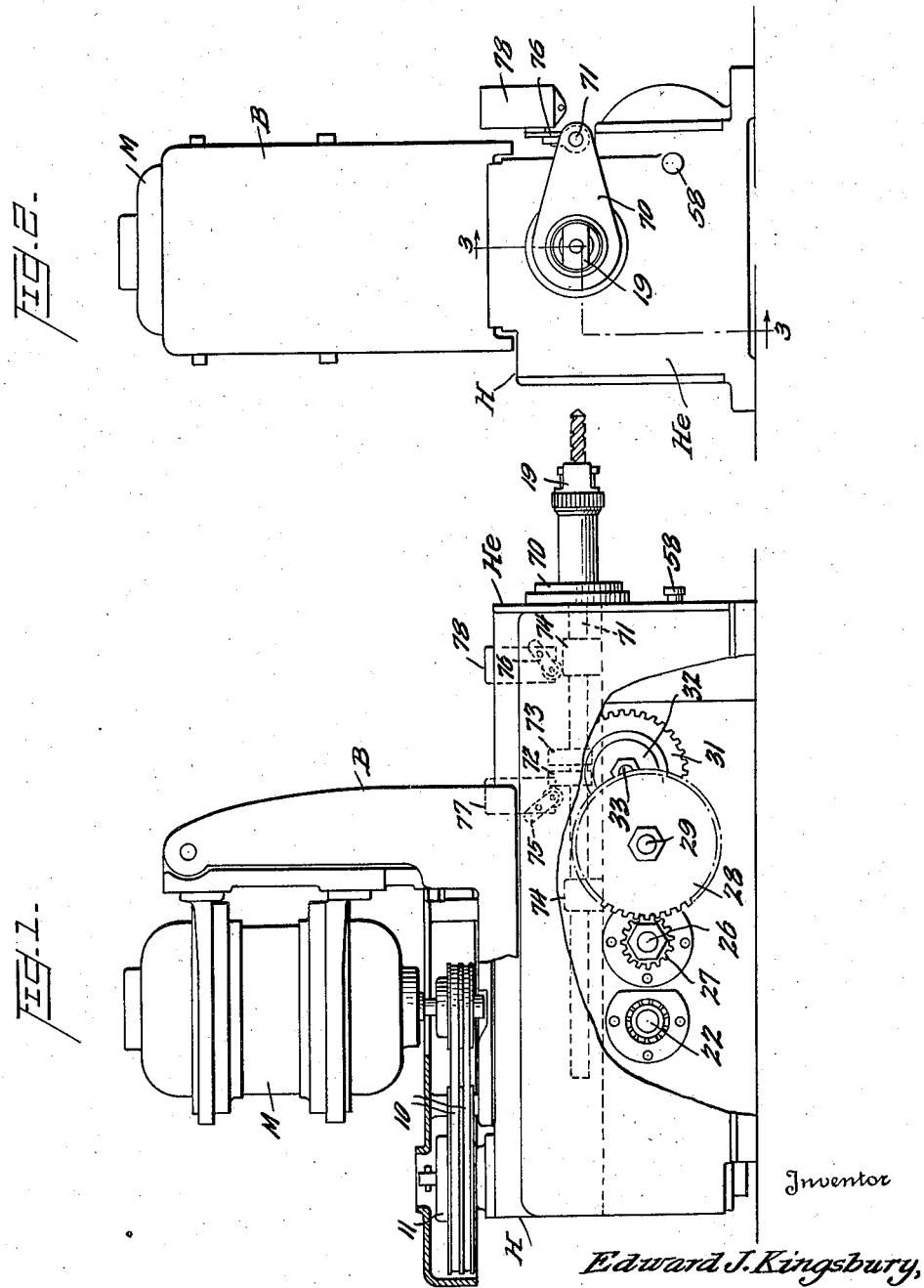

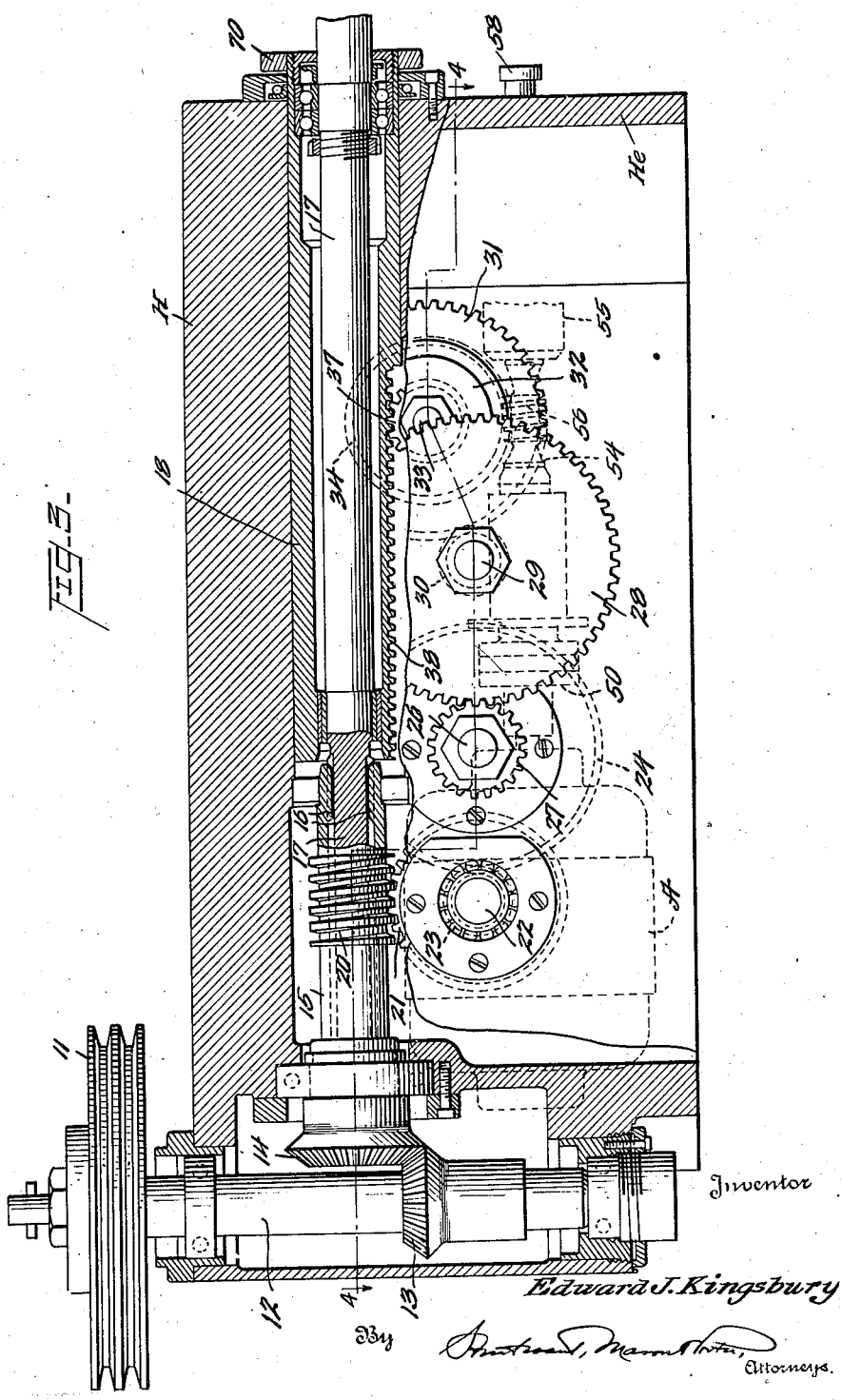

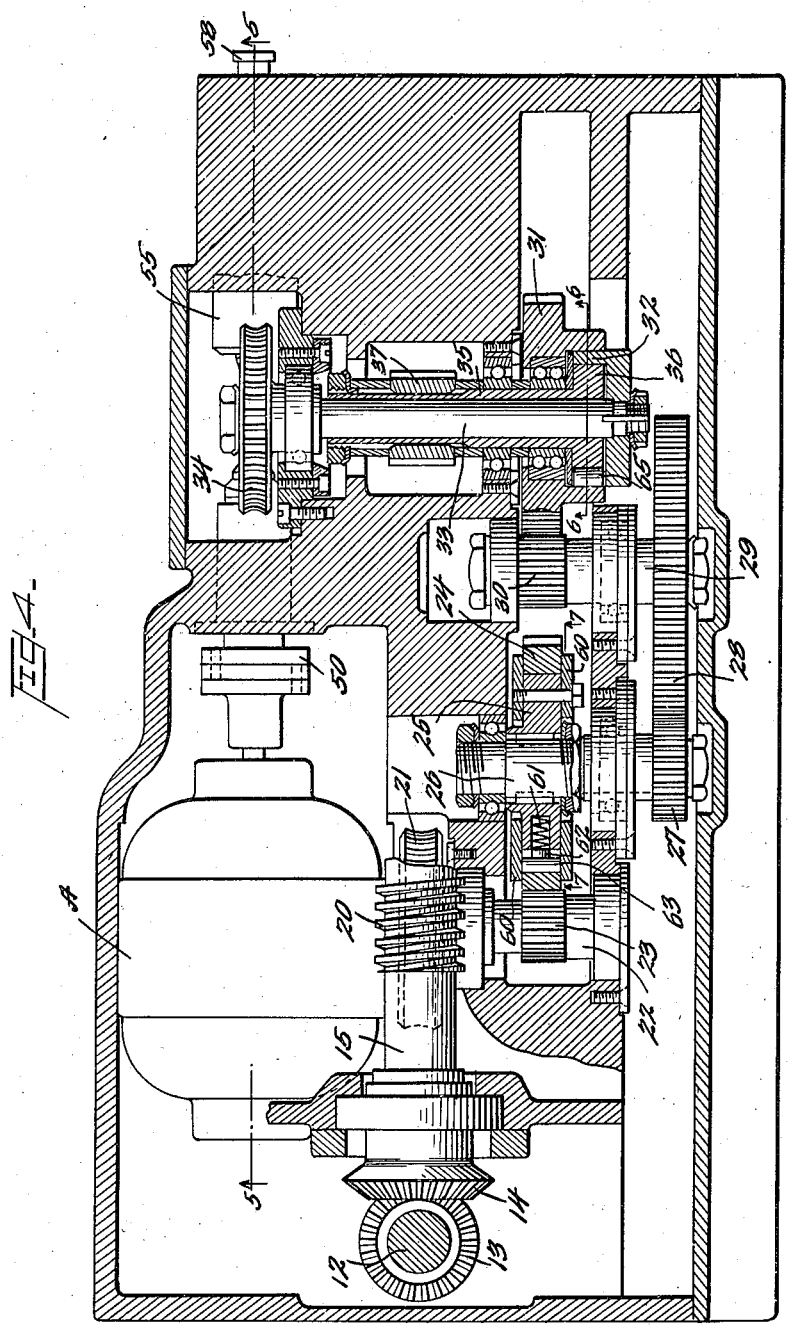

Sept. 8, 1936.　　　　E. J. KINGSBURY　　　2,053,398
MACHINE TOOL UNIT WITH DOUBLE FEEDING SYSTEM
Filed Aug. 11, 1932　　5 Sheets-Sheet 4
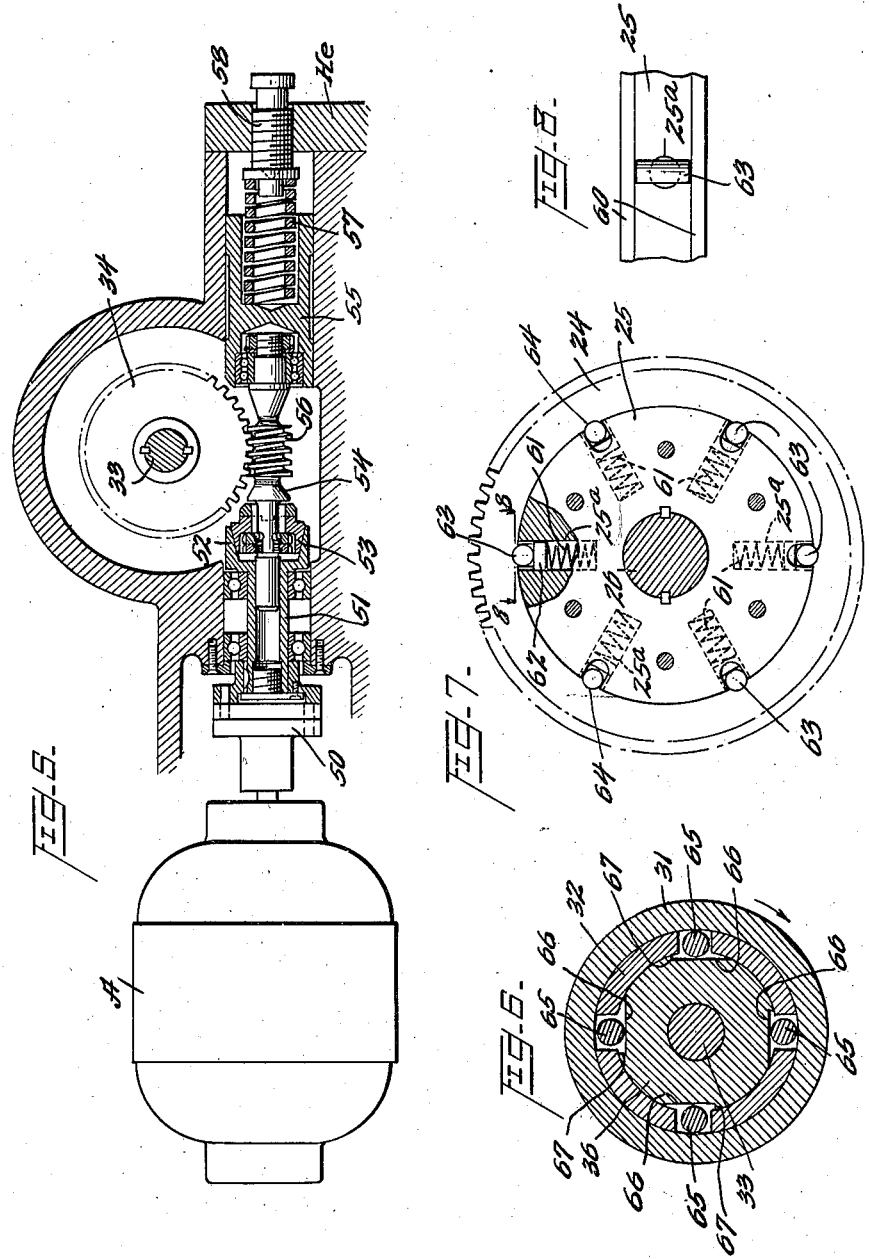
Inventor
Edward J. Kingsbury
By
Attorneys

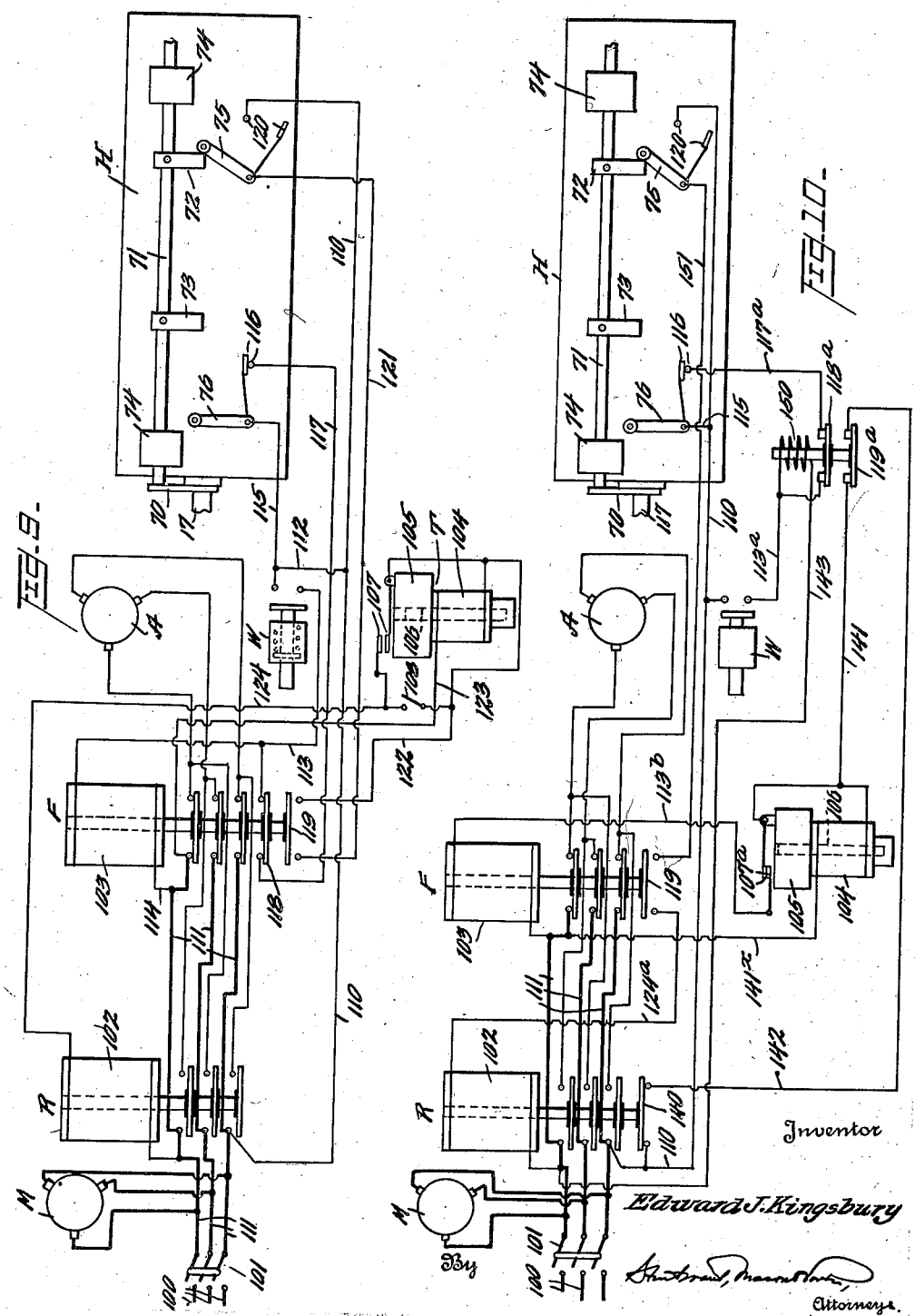

Patented Sept. 8, 1936

2,053,398

UNITED STATES PATENT OFFICE 2,053,398

MACHINE TOOL UNIT WITH DOUBLE FEEDING SYSTEM

Edward Joslin Kingsbury, Keene, N. H.

Application August 11, 1932, Serial No. 628,395

14 Claims. (Cl. 77—32)

The present invention relates to improvements in the machine tool units of the type having a tool operating in consequence of the reciprocating feeding movement, in which the motion for the feeding and withdrawal from feeding is accomplished by a double driving system.

One feature of the present invention is the provision of such a reciprocating feeding movement through two systems operating to move the tool, one of which provides a constant fine feed and the other a coarse feed and withdrawal movement and includes a slip device for obtaining a sensitive release of the coarse feeding during the actual working operation.

Another feature of the present invention is the provision of a feeding mechanism which provides a positive forward feed for the tool, with a rapid approach and withdrawal through the employment of an auxiliary reversible mechanism.

A further object is to provide a feeding system for accomplishing a rapid approach feeding to the work, a slow feeding while the tool is engaged with the work, and a rapid withdrawl from the fed position, along with means for producing a dwell at the forward end of the feeding stroke, before the actual withdrawal of the tool occurs, whereby a facing operation, for example, may be accomplished.

Still another object of the present invention is to provide a system for feeding and withdrawing a tool in which the tool is successively withdrawn and returned prior to the completion of the full feeding movement for the purpose of clearing chips, for example.

A still further object of the invention is the provision of a positive main feeding system which operates to give a slow forward feed, and a reversible auxiliary feeding system including a yielding member which operates to relieve the coarse feeding system during the actual operation of the tool.

Still another feature of the present invention is the provision of a main feeding system for producing a slow positive feeding, together with a reversible auxiliary system for producing a coarse or rapid feeding withdrawal of the tool, this auxiliary system being operated under the control of limit members which effect the reversal of movement from feeding to withdrawal at a predetermined limit of the feeding movement of the tool.

A still further feature of the present invention is the provision of a main feeding system for slowly and positively feeding the tool in conjunction with a reversible auxiliary feeding system for producing a rapid feeding and withdrawal of the tool and including a yielding element to permit a relative disconnection of the auxiliary system while the tool is engaged with the work, along with intermittently operating means to reverse the auxiliary feeding system whereby to withdraw and then return the tool to the work prior to the operation of the tool to a predetermined limit.

With these and other features in view as will appear in the course of the following specification and claims, an illustrative form of construction of the mechanical elements, together with illustrative examples of interconnecting the elements, is set forth on the accompanying drawings, in which:

Figure 1 is a side elevation, with parts broken away, of the machine unit.

Figure 2 is an end elevation of the same.

Figure 3 is a vertical sectional view substantially on line 3—3 of Figure 2, showing the driving connection of the main feeding system.

Figure 4 is a horizontal sectional view substantially on line 4—4 of Figure 3.

Figure 5 is a vertical sectional view substantially on line 5—5 of Figure 4, showing a part of the auxiliary driving system.

Figure 6 is a detail sectional view, on a larger scale, substantially on line 6—6 of Figure 4.

Figure 7 is a similar view substantially on line 7—7 of Figure 4.

Figure 8 is a fragmentary element on line 8—8 of Figure 7, showing a part of the overload safety clutch.

Figures 9 and 10 are circuit diagrams showing connections of the motor control elements.

In the drawings, the unit is shown in Figures 1 and 2 to have a main housing H with an upstanding bracket B thereon for supporting the main motor M which drives the tool, here illustrated as a drill rotated by a spindle which is to be fed and withdrawn by the feeding mechanism of the present invention. The motor M is connected by a pulley and belts 10 to the pulley 11 on a vertical main driving shaft 12 located in the rear end of the housing H and having fixed thereon a bevel gear 13 which is in mesh with a bevel gear 14 fixed on the hollow shaft 15 having internal axial teeth 16 engaging in corresponding external teeth on the spindle 17. The spindle 17 extends forwardly and is journaled in a quill 18 and held against axial movement relative to this quill, and likewise extends at the front of the machine to support a drill chuck 19 in this illustrative form.

The hollow shaft 15 has a worm 20 thereon in mesh with the worm wheel 21 on the first transverse shaft 22 which has a gear 23 fixed thereto and in mesh with the gear teeth of a ring 24 surrounding the overload clutch core 25, and operating by the means and under the conditions hereinafter described to drive the core 25 and therewith a second transverse shaft 26 which has a gear 27 thereon in mesh with the large gear 28 of a third transverse shaft 29. This third transverse shaft 29 has a gear 30 in mesh with teeth on the overrunning clutch ring 31 which surrounds the intermediate bushing 32 of this overrunning clutch, which in turn is secured to a fourth transverse shaft 33 extending through the housing H and provided on the opposite end thereof with a worm wheel 34. Surrounding the shaft 33 is a hollow shaft 35 provided at one end with a flange 36 forming a core of the one-way clutch assembly, this hollow shaft 35 having a gear 37 fixed thereto for engagement with the rack teeth 38 formed on the quill 18.

In this illustrative form, the auxiliary feeding system is operated by an independent auxiliary motor A (Figures 4 and 5) which is directly connected through a universal joint 50 with a hollow shaft 51 having an axially extending concentric flange 52 providing the external member of a conical slipping clutch in conjunction with the internal member 53 secured to a shaft 54 which extends into and is guided by the hollow shaft 51 at one end and extends into and is guided by a hollow plunger piece 55 at the other end, while between its ends it is provided with a worm 56 in meshing relationship with the worm wheel 34 on shaft 33. The clutch members 52, 53 are normally maintained engaged by the action of a spring 57 upon the plunger piece 55, and this spring action is regulated by a threaded adjusting member 58 carried by an end plate He of the housing H.

The detail of the overload safety clutch 24, 25 (Figures 4, 7 and 8) includes the side plates 60 which are held fixedly to the core 25 and serve to maintain the ring 24 against axial movement. The core 25 is provided along spaced radii with holes 25a in each of which is located (Figure 7) a compression spring 61 operating to force a plunger piece 62 outwardly and thereby maintain a roller 63 engaged in a corresponding cavity 64 on the internal surface of the ring member 24.

The overrunning clutch assembly (Figures 4 and 6) is such that the outer ring 31 has a cylindrical internal surface which is closely fitted by the intermediate bushing 32, this intermediate bushing being cut away at spaced peripheral distances to provide radial recesses for the reception of the driving rollers 65, while the core 36 is provided with the chordal flat surfaces 66 at correspondingly spaced points of its periphery, these surfaces each terminating in a substantially radial wall 67.

The various shafts and structures are preferably supported and permitted freedom of relative movement by the employment of anti-friction bearings as indicated in the drawings.

Fixedly connected to the end of the quill 18 which extends through the front of the housing H is a laterally projecting bracket member 70 which is likewise fixedly connected to a control rod 71 extending parallel to the spindle axis, and preferably located externally of the housing H (Fig. 2). The rod 71 is moved linearly with the quill and spindle during the feeding and withdrawal movements. The rod 71 is provided with a pair of dogs 72, 73 which may be fixed at any desired point on the rod, the rod itself being guided for rectilinear movement by brackets 74, 74a on the housing H. These dogs 72, 73 operate at the predetermined limits of the feeding and withdrawal movements to actuate the rocker arms 75, 76 of the switches illustrated as enclosed (Fig. 1) in the switch housings 77, 78; dog 73 also engaging the bracket 74a shortly after operating the switch rocker arm 76, so that the quill is held against further feeding movement and the overload clutch (Fig. 7) slips for the time period until the delay device T operates for reversing the quill movement, whereby a "dwell" at the end of the feeding movement is accomplished at a predetermined point.

In the circuit diagram of Figure 9 is illustrated a method of connecting the auxiliary motor with the limiting switches controlled by the arms 75, 76 for attaining the operation of the system whereby forward feeding is initiated upon depression of an operator's control button whereby to effect a rapid forward approach feeding, a positive slow minimum working feed, a delay or dwell of the tool at its forward limit of feeding, and a rapid withdrawal from fed position, the cycle ultimately terminating in the return of the parts to fully withdrawn position ready for a further cycle upon depression of the operator's button. Further the dwell at the end of the feeding movement may be eliminated by closure of a simple electric control switch.

In Figure 9, the connections are shown as applied to the employment of main and auxiliary motors of three phase type which are to be operated from the three phase network 100 upon closure of the main switch 101 for the unit whereby the conductors 111 are energized for the motor M and the contacts of two electromagnetically operated relays R and F which are employed for the auxiliary motor A, one serving to energize the motor A for "reverse" movement in one direction and the other for "forward" movement in the other direction through the closure of appropriate contacts upon the energization of the solenoids 102 and 103. The operator's button W is of the type which closes a circuit upon depression and then opens the circuit when the pressure is released.

A time delay device T includes a solenoid 104, a damping or dash pot device 105 for determining the time required for the movement of the core 106 in an upward direction upon energization, and contacts 107 which are closed by the upward movement of the core 106 at the end of the full upward movement of the same. A manually operable switch 108 is indicated for short circuiting the contacts 107.

When the spindle is in completely withdrawn position (Fig. 3), for example, the dog 72 is holding the rocker 75 to maintain contacts 120 open. The main motor M is revolving, and the auxiliary motor A is at a standstill, and worm 56 is at a standstill and holds worm gear 34 against movement. The rollers 65 are free of the ring 31, as the bushing 32 has been pressing them against the shoulders 67. The fine forward feeding movement produced by the main motor M upon the ring 31 can not cause any feeding of the quill.

When it is desired to accomplish a drilling operation, the operator's button W is depressed whereby a circuit is momentarily closed from conductor 110 by branch conductor 112 through the operator's button to conductor 113 and thence to the solenoid 103 with a return by conductor 114 to another phase conductor 111. Solenoid 103 closes the "forward" relay F and therewith a holding circuit is established from conductor 110 by conductors 112 and 115, the closed contacts 116 controlled by switch rocker 76, conductor 117, the closed bridge 118 of relay F to conductor 113 and thus through the solenoid 103 to continue its energization. The closure of the relay F has likewise resulted in an energization of the motor A for forward feeding movement.

As the dog 72 leaves rocker 75, the contacts 120 are closed, but no circuit is established thereby as the bridge 119 of the "forward" relay F is now raised away from its contacts.

The rotation of the main motor M operates through its gear train and the overload release clutch (Fig. 7) to drive the ring 31 constantly in a clockwise direction (arrow, Fig. 6) at a uniform rate of speed except as the overload release clutch may disconnect the driving train. The auxiliary motor A is likewise operating through its worm 56 and worm wheel 34 to cause the shaft 33 and its connected sleeve 32 to move likewise in a clockwise direction but at a greater rate of speed. During the initial or approach feeding of the quill 18, before the tool strikes the work, there is very little resistance to the free rotation of the core 36, its gear 37, and the quill 18 itself. Hence the auxiliary motor A drives the system and moves the core 36 while the rollers 65 rest on the surfaces 66 as they are driven by the bushing 32.

When the tool strikes the work, there is a reaction from the tool through the quill 18 against gear 37 and thus upon the core 36. The latter is no longer free to move, and the constant pressure of bushing 32 presses the rollers 65 until they engage between the core 36 and ring 31 and establish a tight lock between these elements. The bushing 32 is however prevented from forward movement at the rate corresponding to that of the rotation of auxiliary motor A. The worm 56 therefor tends to thread upon the worm wheel 34, which is being held back by the bushing 32, and the clutch parts 52, 53 are disengaged to relieve the auxiliary motor A.

By reason of this tight lock between core 36 and ring 31, the aforesaid constant driving motion from main motor M to ring 31 produces a fine forward feeding of the tool while it is thus engaged with the work. Excessive resistance encountered by the tool causes a slippage in the overload release clutch (Fig. 7).

When the dog 73 encounters switch rocker 76 and opens contacts 116 and thereby breaks the holding circuit which has been maintained through conductor 117 and bridge 118, the solenoid 103 is de-energized and thus the energization of auxiliary motor A in a forward direction is interrupted. Meanwhile the dog 73 has continued in its movement with the quill until stopped by bracket 74a which determines the limit of feeding movement. The auxiliary motor A rapidly comes to a standstill when de-energized by the opening of the relay F, and the overload release clutch operates to prevent breakage of driving parts. As the relay F drops to open position, its bridge 119 closes the contacts shown beneath it and establishes a circuit from conductor 110 by contacts 120 controlled by switch arm 75, conductor 115, bridge 119, conductor 122 through solenoid 104 and returning by conductor 123 to a phase conductor 111. The time delay device T is energized and after a period of time determined by the operation of the device 105, the core 106 causes closure of the contacts 107 so that a further circuit is established from conductor 122 through contacts 107, conductor 124, and solenoid 102 with a return to a phase conductor 111. Meanwhile the motor A has remained at a standstill, and the quill has had a "dwell" or extremely slow feed at the forward fed position for facing to a definite depth, that is, between the time of opening of contacts 116, and the engagement of fixed bracket 74a by dog 73 and the closure of the time delay device T.

When this further circuit through contacts 107 is closed, solenoid 102 is energized and the "reverse" relay R is operated to cause an energization of the auxiliary motor A for rotation in a reverse direction by reason of the reversal of connection of two phase conductors. The motor A then effects a rapid withdrawal of the tool from its fully fed position. The dog 73 leaves rocker 76 and contacts 116 close again, but no circuit is established as the bridge 118 is in its lower position.

For this rapid withdrawal, the auxiliary motor A turns the worm 56 and thus the worm wheel 34 and bushing 32 in the opposite direction from that of the forward feeding (i. e. counterclockwise in Fig. 6). This counterclockwise movement of bushing 32 disengages the rollers 65 from their tight lock between core 36 and ring 31, and moves rollers 65 until they encounter the shoulders 67, so that the bushing 32 may directly drive the core 36 in a counterclockwise direction (Figs. 3 and 6), and withdraw the quill at a rapid rate corresponding to the movement of auxiliary motor A. The shoulders 67 are at such an angle, with respect to the internal surface of ring 31, that little or no wedging effect occurs, and hence the ring 31 is free to continue in its slow forward movement as produced by the main motor M, during this withdrawal.

At the completion of the withdrawal movement, dog 72 operates rocker 75 to open contacts 120, and thus the circuits through conductor 115, bridge 119 and conductor 122 to solenoid 104 and by contacts 107 to solenoid 102 are simultaneously de-energized and the time delay device T and the relay R open. The parts have thus been restored to the original condition and are ready for a further actuation by depressing operator's button W again.

When the parts are connected as shown in the circuit diagram of Figure 10, the tool is given a rapid approach feeding as before through the operation of the auxiliary motor A and in addition the tool is periodically withdrawn from the work and then returned for a further operation by the periodic reversal of the auxiliary motor A.

In this diagram, the supply conductors 100 are connected by a switch 101 as before to the phase conductors 111 leading to the motor and to the two electromagnetically actuated relays R and F which control the direction of movement of the auxiliary motor A. When the tool is in the fully withdrawn position, the dog 72 engages the rocker 75 and holds contacts 120 open as before. When the operator's button W is depressed, a circuit is closed from one phase conductor 111 through conductor 110, through the contacts of the button W, by conductor 113a to the solenoid 150 of a holding relay which has two bridges 118a and 119a, with a return of the current by conductor 143 back to a phase conductor 111. The closure of bridge 118a establishes a holding circuit from bus conductor 110 by branch conductor 115 to contacts 116 of the other limit switch and conductor 117a, bridge 118a, through the solenoid 150 and return conductor 143. The closure of bridge 119a establishes a circuit from bus conductor 110, through the normally closed bridge 140 of relay R, by conductor 142, bridge 119a, conductor 141, contacts 107a, conductor 113b, and solenoid 103, back to a phase conductor 111. The operation of solenoid 103 raises the bridge arms of relay F and opens the contacts at bridge 119. Other bridges connect the phase conductors 111 to the motor A and cause it to turn for feeding the tool rapidly forward as before. A further branch circuit from conductor 141 has also been established through bridge 119a, leading through solenoid 104 of the time delay device, and by conductor 141x back to a phase conductor 111. The solenoid 104 operates to move the core 105 and at the end of a predetermined time the contacts 107a are opened, thus rupturing the circuit through the solenoid 103 of the "forward" relay F, so that its bridges drop. The forward feeding movement of lug 72 has permitted the closure of contacts 120. Thus a circuit is established from conductor 110, through contacts 120, conductor 151, bridge 119, conductor 124a, and solenoid 102 of the reverse relay R back to a phase conductor 111. The opening of circuits through the forward relay F de-energizes the auxiliary motor A and the closure of bridges in reverse relay R causes an energization of auxiliary motor A for a movement in a reverse direction, whereby it rapidly draws the tool, for example a drill, back out of the hole, thus clearing any chips that may be present. The movement of the reverse relay R has however raised the bridge 140 so that the existing circuit through conductors 142, 141 is de-energized and the time delay device is restored to the original position owing to the de-energization of the solenoid 104.

When the auxiliary motor A has withdrawn the quill and tool so that the dog 72 encounters switch arm 75 and opens contacts 120, the solenoid 102 is de-energized and solenoid 103 is again energized as before so that the motor A is again driven for a feeding movement, and accomplishes a further operation for the period of time determined by the delay device. This is repeated until finally, at the completion of the tool operation, the dog 73 encounters rocker 76 and opens contacts 116. This opens the holding circuit of the holding relay solenoid 150 so that bridges 118a, 119a drop and no further current may be supplied to conductor 141 to cause the energization of either the delay device solenoid 104 or the forward relay solenoid 103. Therefore bridge 119 remains normally engaged with its contacts and since contacts 120 are likewise closed in the limit switch, the final reverse movement of auxiliary motor A results in an opening of contacts 120 and therewith a de-energization of the solenoid 102 of the reverse relay R and ultimately the motor A comes to a standstill with the quill and tool completely withdrawn.

In the form of construction shown in Figure 9, it is possible by the closure of switch 108 to short circuit the time delay device T so that the quill and tool are immediately withdrawn upon the completion of the forward feeding movement.

In the unit, a slow positive working feed is accomplished by the driving system actuated by the main motor M, and controlled as to degree or rate of feeding by the ratios of the gear system, so that changes in the rate of this slow or positive feed may be accomplished by varying the gears 27, 28. A rapid approach feed or initial feeding of the quill and tool from the withdrawn position until the tool is in contact with the work, is produced by the forward movement of the auxiliary motor A which operates through the overrunning clutch 31, 32, 36 to advance the quill at a greater rate of feed than the positive feed from the main motor M. When the tool encounters the work, the clutch elements 52, 53 in the driving system of auxiliary motor A slip, this being assisted by the threading of the worm 56 onto the worm wheel 34 against the action of spring 57, so that the auxiliary driving system actuated by motor A merely follows the positive feed by the driving system from the motor M.

When however the direction of operation of the auxiliary motor A is reversed, the spring 57 and the partial engagement of clutch members 52, 53 quickly bring the parts together, since they are turning in a reverse direction from the main motor M and now the spring 57 assists the aforesaid threading into the worm wheel 34 to maintain the hollow shaft 51 and worm 56 at the same angular speed, and thus the auxiliary motor A operates to move the quill backward, while the rollers 65 of the overrunning clutch are moved against the radial walls 67 and thus establish a drive from the bushing 32 to the core 36 independently of the movement of the ring 31.

It is obvious that the invention is not limited solely to the form of construction shown, but that it may be utilized in many ways without departing from the scope of the appended claims.

Having thus described the invention, what I claim as new and desire to secure by Letters Patent, is:—

1. A machine tool unit including a frame, a tool holder reciprocable relative to the frame between fed and withdrawn positions, fed and withdrawn position limit devices including cooperative parts fixed to said frame and tool holder, a first feeding system connected for moving said tool holder positively from withdrawn to fed position at a slow rate and including an overload-slip clutch, a reversible second driving system connected for moving said tool holder at a fast rate from withdrawn toward fed position and from fed to withdrawn position and including a sensitive overload clutch, and means actuated by said limit devices for controlling the direction of operation of said reversible second system and including a timing device for delaying the reversal of said second system after said fed position limit device is operated.

2. A drilling machine including a frame, a drill spindle reciprocable relative to the frame between fed and withdrawn positions, a first motor and means actuated thereby for producing a slow forward feed and including a first overload clutch and an overrunning clutch, a second motor and means actuated thereby for producing a fast forward and a fast withdrawal feed and including a second overload clutch operative during forward feeding, and means for feeding said spindle forward by overrunning said overrunning clutch and for withdrawing the spindle by causing release of said first overload clutch, and limit switches for controlling the direction of rotation of said second motor.

3. A machine tool unit including a frame, a tool holder reciprocable relative to the frame, a first feeding system continuously active for moving the tool holder toward fed position at a slow rate and including a first overload clutch and an overrunning clutch, a reversible second feeding system active for moving the tool holder forward toward fed position and for moving it back to withdrawn position at fast rates and operative through said overrunning clutch for disconnecting said first feeding system during a preliminary portion of the forward feeding movement, a second overload clutch included in said second feeding system whereby said second feeding system is disengaged from the tool holder when a predetermined resistance is opposed to the movement of the tool holder toward fed position, and means for producing a reversal of said second feeding system and therewith causing a withdrawal of the tool holder with slippage of said first overload clutch.

4. A machine tool unit including a frame, a tool holder movable relative to the frame, mechanism for producing a slow forward movement of the holder, a reversible feed motor and connected mechanism for producing rapid forward and backward movements of the holder throughout its entire stroke and including an overload release clutch for slippage under the back pressure while a tool in said holder is engaged with the work, means on the frame for stopping the forward movement at the end of the stroke, a circuit breaker operated by the holder at the end of its forward movement and circuit means including a relay having a timing element for initiating a backward movement thereof after a delay and including a device for adjusting the time period of the relay timing element for determining the length of time of the said relay, and reversing relay means connected for supplying said feed motor and energized through said relay for effecting reversal of said feed motor at the forward end of the stroke of the tool holder.

5. A machine tool unit including a frame, an element reciprocable relative to the frame, a first feeding mechanism including an overrunning clutch and connected to and adapted at all times to impose a feeding effort through said overrunning clutch upon said element tending to advance said element at a slow rate; said overrunning clutch including a driving member, a driven member connected to the element, and a control member; a second feeding system including a reversible driving member and connected to said control member and operative therethrough when said reversible driving member is moving in one direction to impose an effort upon said element throughout its entire advancing movement for producing an advancement thereof at a rapid rate while said clutch driven member overruns and slips with respect to said clutch driving means and effective when moving in the other direction to release said first feeding system, and an overload release device in said second feeding system operative when said reversible driving member is turning in said one direction to permit relative slippage between said reversible driving member and said element when the resistance to advancement of said element exceeds a predetermined maximum and operating automatically by the effect of its continued effort through said control member to restore said second feeding system to its rapid advancement of the element whenever the resistance drops below said maximum during advancement at a slow rate.

6. A machine tool unit including a frame, a movable element reciprocable relative to the frame, an overrunning clutch having a first clutch member connected for moving said element, a first feeding mechanism connected to a second member of said overrunning clutch and adapted at all times to impose a feeding effort upon said first clutch member for advancing the movable element at a slow rate, a second feeding system including a reversible driving member and a control member for said overrunning clutch and operative therethrough when said reversible member is moving in one direction to impose a substantially constant effort upon said movable element throughout its entire advancing movement for advancing said movable element at a rapid rate while said overrunning clutch slips with respect to said first feeding mechanism and operative when said reversible member is moving in the other direction for moving said control member to release said two clutch members from one another and effect a rapid withdrawal of the movable element, and a sensitive overload release device in said second feeding system operative when said reversible member is turning in said one direction to permit relative slippage when the resistance to advancing movement of said movable element exceeds a predetermined maximum and operating automatically to restore said second feeding system to its rapid advancement whenever the resistance of the movable element drops below said maximum, to forward movement drops below said maximum, said first feeding mechanism operating through said overrunning clutch for imposing a feeding effort upon said movable element for advancing it at a slow rate so long as said reversible driving member is turning in said one direction.

7. A machine tool unit including a frame, a tool holder movable relative to the frame, mechanism for producing a slow forward movement of the holder, reversible mechanism for producing rapid forward and backward movements of the holder throughout its entire stroke and including an overload release clutch for slippage under the back pressure while a tool in said holder is engaged with the work, means for controlling said reversible mechanism at the completion of predetermined relative movements of the holder and frame, means for intermittently producing a reversal of said rapid feed mechanism independently of the position of the tool with respect to the work and including electrical forward and reverse relay means connected for controlling the direction of actuation of said reversible mechanism, a withdrawal limit switch connected to said relay means for ending the withdrawal movement and producing a forward movement, and an adjustable electrically actuated timing device energized upon the actuation of said withdrawal limit switch and effective upon the expiration of the time determined thereby for procuring a termination of the forward movement and producing a withdrawal movement.

8. A machine tool unit including a frame, a tool holder movable relative to the frame, mechanism for producing a slow forward movement of the holder, reversible mechanism for producing rapid forward and backward movements of the holder throughout its entire stroke and including an overload release clutch for slippage under the back pressure while a tool in said holder is engaged with the work, means for controlling said reversible mechanism at the completion of predetermined relative movements of the holder and frame, means for intermittently producing a reversal of said rapid feed mechanism independently of the position of the tool with respect to the work and including electrical forward and reverse relay means connected for controlling the direction of actuation of said reversible mechanism, a forward limit switch, a timing relay, and circuit means connecting said forward limit switch, timing relay and relay means so that the actuation of the limit switch causes said relay means to terminate the forward movement and causes said timing relay to measure a time interval and then effect actuation of said relay means for producing the withdrawal movement, whereby a dwell of the tool occurs at the forward limit of movement.

9. A machine tool unit including a frame, a tool holder reciprocable relative to the frame between fed and withdrawn positions, a withdrawn position limit contact device including cooperative parts fixed to the frame and holder, reversible electrically operated means for effecting the advancement of the tool holder toward fed position at a variable rate and for returning it to withdrawn position, relay means for effecting the energization of said electrically operated means to procure the movement thereof for feeding and withdrawing, and circuit means including said contact devices and relay means and including also a timing relay and effective for producing a forward movement of the holder for a time measured by said timing relay and thereupon to effect a withdrawal of the holder by reversing said electrically operated means until the withdrawn limit contact device is actuated and thereupon operating to effect an energization of the electrically actuated means for a further forward movement under control of said timing relay, said timing relay being operated independently of the position of the holder to initiate the withdrawal movement of the holder at a predetermined interval of time after the beginning of the forward movement.

10. A machine tool unit including a frame, a tool holder reciprocable relative to the frame between fed and withdrawn positions, withdrawn position limit contact devices including cooperative parts fixed to said frame and holder, a reversible feed motor for advancing the tool holder toward fed position and for returning it to withdrawn position, a second motor means, means actuated by said motor and motor means for producing a rapid rate of advancement and thereafter a slow working feed while the tool is engaged with the work and effective for disengaging the drive from said second motor means upon reversal of said feed motor, the distance of forward advancement varying per unit of time, electrical reversing relay means energized through said limit contact devices and connected to the feed motor for controlling the feeding and withdrawal movements of said holder, timing means connected to said reversing relay means to be energized when the feed motor is energized for forward movement and operating to effect a reversal of the reversible relay means and therewith of said feed motor a predetermined time after its own energization for intermittently causing said holder to return toward withdrawn position, and means included in said reversible relay means and connected with said limit contact devices for procuring a further reversal of direction of said feed motor at the withdrawn limit of stroke.

11. A machine tool unit including a frame, a tool holder reciprocable relative to the frame between fed and withdrawn positions, fed and withdrawn position limit contact devices including cooperative parts fixed to the frame and holder, reversible electrically operated means for effecting the advancement of the tool holder toward fed position at a variable rate and for returning it to withdrawn position, relay means for effecting the energization of said electrically operated means to procure the movement thereof for feeding and withdrawing, circuit means including said contact devices and relay means and including also a timing relay and effective for producing a forward movement of the holder for a time measured by said timing relay and thereupon to effect a withdrawal of the holder by reversing said electrically operated means until the withdrawn limit contact device is actuated and thereupon operating to effect an energization of the electrically actuated means for a further forward movement under control of said timing relay, said timing relay being operated independently of the position of the holder to initiate the withdrawal movement of the holder at a predetermined interval of time after the beginning of the forward movement, said circuit means being connected to said fed limit contact devices and effective through said relay means when the holder has attained fed position and actuates said fed limit contact devices for de-energizing the relay means at the completion of the following withdrawal movement.

12. A machine tool unit including a frame, a movable element reciprocable relative to the frame, a shaft and inner and outer hollow members around the same, said shaft being connected for reciprocating the said movable element, a first means for rotating said outer hollow member constantly in one direction at slow speed, reversible means for rotating said inner hollow member at high speed in either direction and including clutch means for slipping when more than a predetermining working pressure effect is transmitted thereto, said shaft being provided with an overrunning clutch surface, said inner hollow member having an aperture, and a clutch device located in said aperture and engageable with said outer hollow member and with said clutch surface, said overrunning clutch surface being constructed and arranged to effect wedging engagement of said clutch device during the forward rotation of said reversible means and to prevent such wedging engagement during the rearward rotation thereof, so that the rate of forward movement is determined by said reversible means when less than said predetermined pressure is opposed to the movement of the movable element and is determined by said first rotating means when greater than said pressure is opposed thereto and so that the reversal of said reversible means for rearward movement of the movable element releases said first rotating means for effective operation upon said shaft and said reversible means determines the rate of rearward movement.

13. A machine tool unit including a frame, a tool supporting element reciprocable relative to the frame between fed and withdrawn positions, a main feeding system for producing a slow feed and including an overload clutch, a reversible auxiliary feeding system for producing a rapid forward and a rapid withdrawal movement, means including an overrunning clutch for automatically interchanging the driving connection between said tool supporting element and said feeding systems, and limit switches and connected circuit means for controlling the feeding direction of said auxiliary feeding system, said auxiliary feeding system during withdrawal movement operating the overrunning clutch to disconnect the main feeding system.

14. A machine tool unit including a frame, a tool supporting element reciprocable relative to the frame between fed and withdrawn positions, fed and withdrawn position limit devices including cooperative parts fixed to said frame and said element, a main feeding system for moving said element positively from withdrawn to fed position at a slow rate and including an overload clutch, a reversible auxiliary feeding system for moving said element at a rapid rate from withdrawn toward fed position and from fed to withdrawn position, means including an overrunning clutch for automatically interchanging the driving connection between said tool supporting element and said feeding systems, and means energized through said limit devices for controlling the direction of operation of said auxiliary feeding system and including a timing device for delaying the reversal of said auxiliary feeding system after said fed position limit device is operated.

EDWARD JOSLIN KINGSBURY.